US011272556B2

United States Patent
Hariharan et al.

(10) Patent No.: US 11,272,556 B2
(45) Date of Patent: Mar. 8, 2022

(54) BLUETOOTH—ULTRA WIDEBAND SYNCHRONIZATION

(71) Applicant: Apple Inc., Cupertino, CA (US)

(72) Inventors: Sriram Hariharan, San Jose, CA (US); Langford M. Wasada, San Francisco, CA (US)

(73) Assignee: Apple Inc., Cupertino, CA (US)

(*) Notice: Subject to any disclaimer, the term of this patent is extended or adjusted under 35 U.S.C. 154(b) by 19 days.

(21) Appl. No.: 16/745,208

(22) Filed: Jan. 16, 2020

(65) Prior Publication Data
US 2021/0076434 A1    Mar. 11, 2021

Related U.S. Application Data

(60) Provisional application No. 62/897,100, filed on Sep. 6, 2019.

(51) Int. Cl.
*H04W 52/02*    (2009.01)
*H04W 56/00*    (2009.01)
*H04W 76/14*    (2018.01)
*H04W 88/06*    (2009.01)
*H04W 76/15*    (2018.01)

(52) U.S. Cl.
CPC ....... *H04W 76/14* (2018.02); *H04W 52/0209* (2013.01); *H04W 88/06* (2013.01); *H04W 76/15* (2018.02)

(58) Field of Classification Search
CPC . H04W 76/14; H04W 52/0209; H04W 88/06; H04W 76/15; H04W 84/20; H04W 52/0229; H04W 52/0216; H04W 56/004; H04W 56/001; H04W 4/80; Y02D 30/70
See application file for complete search history.

(56) References Cited

U.S. PATENT DOCUMENTS

| 8,203,939 B2 | 6/2012 | Aljadeff et al. |
| 8,644,875 B2 | 2/2014 | Kiukkonen et al. |
| 9,810,766 B2 | 11/2017 | Boyd |
| 10,219,200 B2 | 2/2019 | Yoon et al. |

(Continued)

OTHER PUBLICATIONS

Extended European Search Report for EP 20192623, dated Feb. 2, 2021, 9 pages.

(Continued)

*Primary Examiner* — Joseph E Dean, Jr.
(74) *Attorney, Agent, or Firm* — Kowert, Hood, Munyon, Rankin & Goetzel, P.C.

(57) ABSTRACT

Methods, systems, and apparatuses are presented to utilize Bluetooth (BT) radios to synchronize ultra wideband (UWB) radios, to allow the UWB radios to operate within narrow transmit/receive windows, which may lead to power savings. In some implementations, a transmitting UWB radio and a receiving UWB radio may synchronize the expected time of an UWB transmission based on BT events, such as receiving a BT advertisement, or establishing a BT connection. In some implementations, the transmitting UWB radio and the receiving UWB radio may synchronize the expected time of an UWB transmission based on synchronized event counters maintained by the BT radios. Information regarding UWB transmission start times may also be passed via BT communications, in some implementations.

20 Claims, 5 Drawing Sheets

(56) References Cited

U.S. PATENT DOCUMENTS

2013/0208587 A1     8/2013   Bala et al.
2013/0217332 A1     8/2013   Altman et al.
2019/0135229 A1*    5/2019   Ledvina ................ H04W 4/023

OTHER PUBLICATIONS

Preliminary Rejection for Korean Patent Application No. 10-2020-0111671, dated Jun. 25, 2021, 11 pages.

* cited by examiner

BLUETOOTH—ULTRA WIDEBAND SYNCHRONIZATION

PRIORITY CLAIM

This application claims benefit of priority of U.S. provisional application Ser. No. 62/897,100, titled "Bluetooth—Ultra Wideband Synchronization", filed Sep. 6, 2019, which is hereby incorporated by reference in its entirety as though fully and completely set forth herein.

TECHNICAL FIELD

The present application relates to wireless communication, including to techniques for synchronizing high-power radios via communications by lower-power radios.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

Such varied wireless communication devices may utilize a number of different radio access technologies (RATs) and/or radios. For example, various RATs may have advantages and disadvantages relative to other RATs. For example, a first RAT, such as Bluetooth, may operate with relatively little power consumption. A second RAT, such as ultra wideband (UWB) may be more capable of performing multipath isolation or ranging operations, but may consume power at a higher rate while operating in a fully operational state. In particular, certain high-power radios, such as UWB may consume large amounts of power during initial synchronization, as they may traditionally be required to remain in a fully operational state for a prolonged period of time while listening for neighboring devices.

Accordingly, improvements in the field are desired.

SUMMARY

Embodiments are presented herein of, inter alia, systems, apparatuses, and methods for utilizing Bluetooth (BT) radios to synchronize ultra wideband (UWB) radios, to allow the UWB radios to operate within narrow transmit/receive windows.

A wireless communication device is disclosed, which may include a first radio, a second radio, and a processor. The first radio may be configured to establish a connection with a remote wireless device according to a first radio access technology (RAT) and provide an indication to the processor that the connection has been established. After providing the indication, the first radio may receive, from the remote wireless device, a notification that the remote wireless device will transmit a communication according to a second RAT, wherein the notification includes an offset time. The first radio may be further configured to provide the offset time to the processor. The processor may be configured to store a timestamp indicating a time at which the processor receives the indication that the connection has been established; and provide to the second radio an instruction to receive the communication according to the second RAT at a set time, wherein the set time is determined by adding the offset time to the time indicated by the timestamp. The second radio may be configured to, in response to receiving the instruction to receive the communication according to the second RAT, transition from a low-power state to a high-power state at the set time and receive the communication according to the second RAT. The second radio may be configured to transition from the high-power state to the low-power state after receiving the communication according to the second RAT.

In some scenarios, the first RAT may be Bluetooth and the second RAT may be ultra wideband (UWB).

In some scenarios, in establishing the connection with the remote wireless device according to the first RAT, the first radio may be configured to receive, from the remote wireless device, an advertisement message according to the first RAT; and transmit, to the remote wireless device, a connection request message according to the first RAT, in response to receiving the advertisement message. In some scenarios, in providing the indication to the processor that the connection has been established, the first radio may be configured to provide an indication to the processor that the connection request has been transmitted.

In some scenarios, in providing to the second radio the instruction to receive the communication according to the second RAT at a set time, the processor may be configured to initiate a timer configured to expire at the set time. In response to expiration of the timer, the processor may provide to the second radio an instruction to immediately receive the communication according to the second RAT.

In some scenarios, in transitioning from a low-power state to a high-power state at the set time, the second radio may be configured to receive from the processor an indication of the time remaining until the set time. In response to expiration of the time remaining, the second radio may transition from the low-power state to the high-power state.

In some scenarios, the communication according to the second RAT may be an ultra wideband (UWB) ranging request message. In such scenarios, the second radio may be further configured to transition from the low-power state to the high-power state at a predetermined time after receiving the UWB ranging request message; in response to receiving the UWB ranging request message, transmit an UWB ranging response message while operating in the high-power state; and transition from the high-power state to the low-power state after transmitting the UWB ranging response message.

A wireless communication device is disclosed, which may include a first radio and a second radio. The first radio may be configured to maintain an event counter that is incremented in response to a periodic handshake procedure with a remote wireless device, according to a first radio access technology (RAT). The first radio may further be configured to receive, from the remote wireless device, a notification that the remote wireless device will transmit a communication according to a second RAT, wherein the notification indicates a future value of the event counter at which the communication will be transmitted. The second radio may be configured to transition from a low-power state to a high-power state when the event counter reaches the future value indicated in the notification that the remote wireless device will transmit the communication according to the second RAT. The second radio may further be configured to receive the communication according to the second RAT, and transition from the high-power state to the low-power state after receiving the communication according to the second RAT.

In some scenarios, the first radio may be further configured to establish a connection with the remote wireless device according to the first RAT prior to receiving the notification that the remote wireless device will transmit the communication according to the second RAT.

In some scenarios, the wireless communication device may further include a processor. The first radio may be further configured to provide to the processor the future value of the event counter, as well as a value of the event counter that is current at the time the first radio provides to the processor the future value of the event counter. The processor may be configured to, in response to determining that the event counter has reached the future value, provide to the second radio an instruction to receive the communication according to the second RAT. The second radio transitioning from the low-power state to the high-power state may be in response to receiving the instruction from the processor.

In some scenarios, the first radio may be further configured to periodically provide to the processor a current value of the event counter.

In some scenarios, the first radio may be further configured to provide to the processor an indication that the event counter has reached the future value.

In some scenarios, the first radio may be further configured to provide to the second radio an indication that the event counter has reached the future value. The second radio transitioning from the low-power state to the high-power state may be in response to receiving the indication that the event counter has reached the future value.

In some scenarios, the value of the event counter matches a value in a remote event counter maintained by the remote wireless device.

A wireless communication device is disclosed, which may include a first radio and a second radio. The first radio may be configured to receive, from a remote wireless device, an advertisement message according to a first radio access technology (RAT); and to provide, to the second radio, an indication that the advertisement message has been received, wherein the indication includes a timestamp indicating a time at which the advertisement message was received by the first radio. The second radio may be configured to, in response to receiving the indication that the advertisement message has been received, transition from a low-power state to a high-power state at a set time, wherein the set time is determined by adding a first offset time to the time indicated by the timestamp. While operating in the high-power state, the second radio may receive, according to a second RAT, acquisition information regarding a subsequent communication according to the second RAT, wherein the subsequent communication follows the acquisition information by a second offset time, wherein the acquisition information indicates the second offset time. The second radio may be further configured to transition from the high-power state to the low-power state after receiving the acquisition information.

In some scenarios, the second radio may be further configured to transition from the low-power state to the high-power state in response to expiration of the second offset time. While operating in the high-power state, the second radio may receive the subsequent communication according to the second RAT. The second radio may be configured to transition from the high-power state to the low-power state after receiving the subsequent communication according to the second RAT.

In some scenarios, the advertisement message may indicate the value of the first offset time. In other scenarios, the offset time may be predetermined.

In some scenarios, the indication that the advertisement message has been received may include a medium access control (MAC) address to which the advertisement message was addressed. The second radio may be further configured to confirm that the acquisition information is also addressed to the MAC address.

In some scenarios, the first radio may include a first clock and the second radio may include a second clock. The second radio may be further configured to determine a value of the second clock upon detecting a signal edge on an interface between the first radio and the second radio, and receive from the first radio a value of the first clock upon the first radio detecting the signal edge on the interface between the first radio and the second radio. The second radio may be further configured to determine a difference between the value of the second clock and the value of the first clock. Determining the time indicated by the timestamp may include adjusting the value of the timestamp by the difference between the value of the second clock and the value of the first clock.

Methods are presented for performing functions similar to those performed by the wireless communication devices summarized above.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
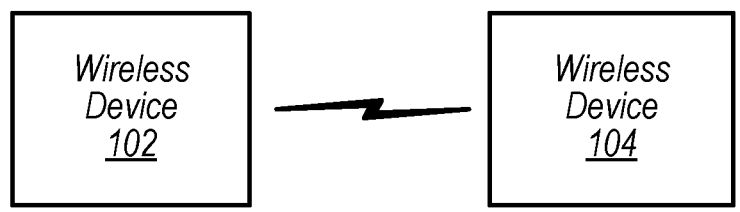
FIG. 1 illustrates an example wireless communication system, according to various exemplary embodiments described herein.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

Various details of example UWB communication protocols are disclosed in IEEE 802.15.4-2015, which is hereby incorporated by reference as though disclosed herein in its entirety.

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device. Other examples may include less mobile devices, such as desktop computers, entertainment centers, set-top boxes, climate control modules, security modules, smart home control modules, smart appliances, electronic doors/locks, vehicles, etc.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques, potentially including secure ranging wireless communication techniques.

As one possibility, the first wireless device 102 and the second wireless device 104 may communicate using ultra wideband (UWB) communication technology (e.g., IEEE 802.15.4 WPAN communication), Wi-Fi (e.g., IEEE 802.11), and/or other techniques based on WPAN or WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102, 104 may be any of a variety of types of wireless device. As one possibility, one or more of the wireless devices 102, 104 may be a substantially portable wireless user equipment (UE) device, such as a smart phone, hand-held device, a wearable device, a tablet, a motor vehicle, or virtually any type of mobile wireless device. As another possibility, one or more of the wireless devices 102, 104 may be a substantially stationary device, such as a set top box, media player (e.g., an audio or audiovisual device), gaming console, desktop computer, appliance, environmental controller, door, or any of a variety of other types of device.

Each of the wireless devices 102, 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102, 104 may include one or more antennas for communicating using one or more wireless communication protocols. In some cases, one or more parts of a receive and/or transmit chain may be shared between multiple wireless communication standards. For example, a device might be configured to communicate using either of Bluetooth or UWB using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1xRTT, and separate radios for communicating using each of UWB, Wi-Fi, and/or Bluetooth. Other configurations are also possible.

As previously noted, aspects of this disclosure may be implemented in conjunction with the wireless communication system of FIG. 1. For example, the wireless devices 102, 104 may communicate using one or more synchronization techniques or features described subsequently herein with respect to FIGS. 4-6. By utilizing such techniques (and/or other techniques described herein), the wireless device(s) may (at least according to some embodiments) be able to achieve more efficient communication.

Figure 2:
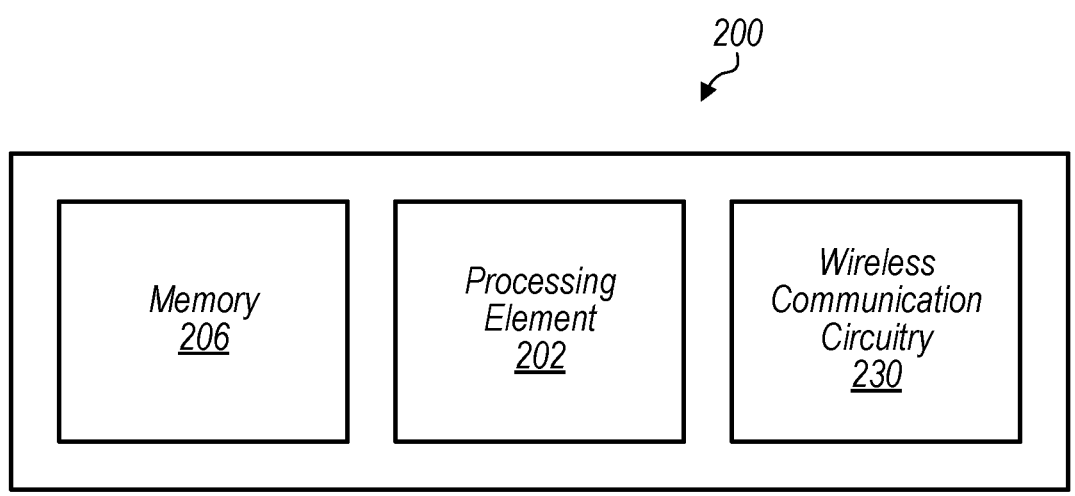
FIGS. 2-3 are block diagrams illustrating example wireless devices, according to various exemplary embodiments described herein.
Figure 3:
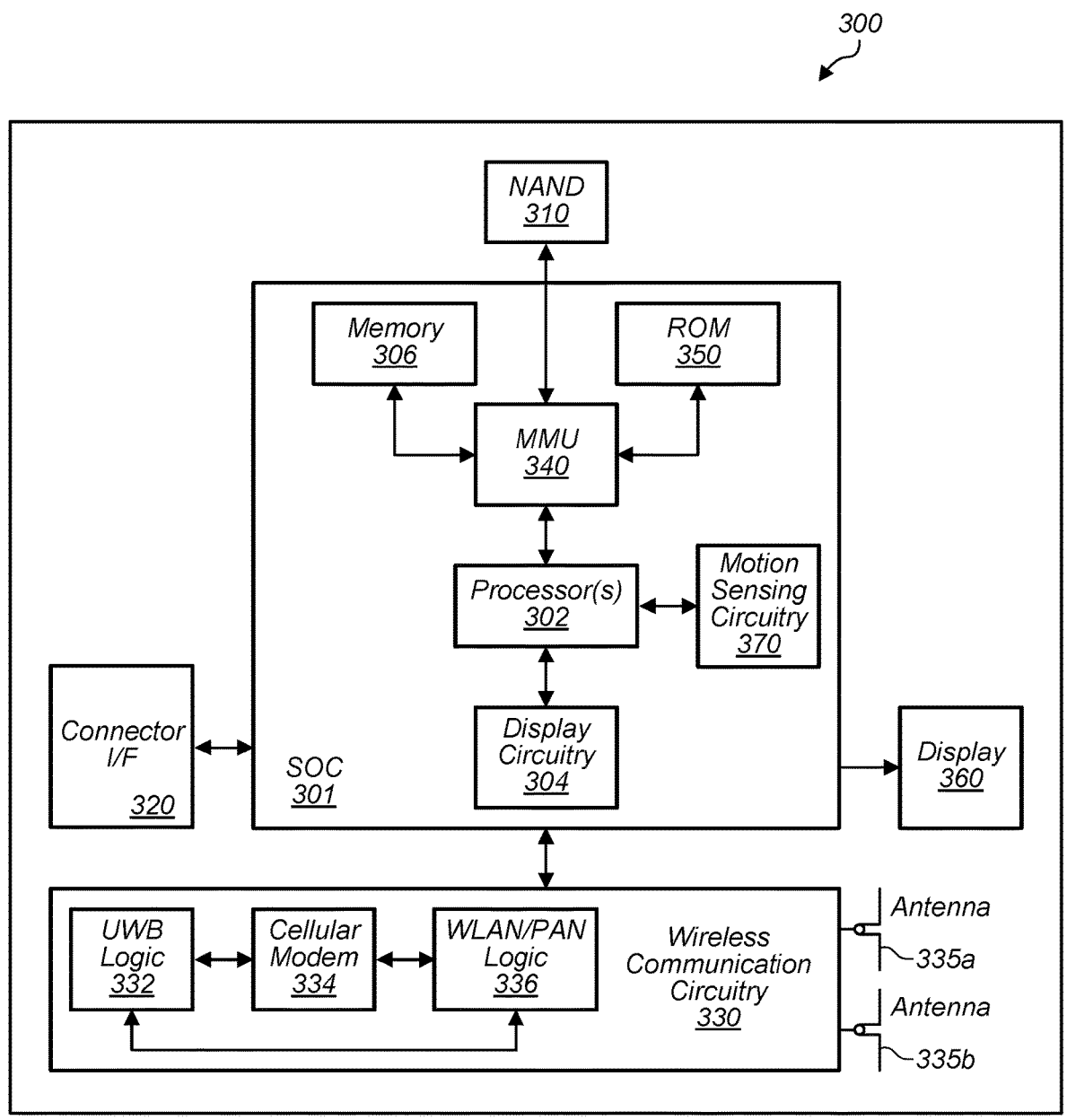

FIGS. 2-3—Exemplary Device Block Diagrams

FIG. 2 illustrates an exemplary wireless device 200 that may be configured for use in conjunction with various aspects of the present disclosure. For example, the device 200 may be an example of the wireless device 102 or the wireless device 104. The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more synchronization techniques or features, such as any of the techniques or features illustrated and/or described subsequently herein with respect to any or all of FIGS. 4-6.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be (or include) an 'application processor' whose primary function may be to support application layer operations in the device 200, while the wireless communication circuitry 230 might include a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for UWB, LTE, LTE-A, CDMA2000, Bluetooth, Wi-Fi, NFC, GPS, etc.).

The wireless device 300 may include at least one antenna, and in some embodiments, multiple antennas 335a and 335b, for performing wireless communication with base stations and/or other devices. For example, the wireless device 300 may use antennas 335a and 335b to perform the wireless communication. As noted above, the wireless device 300 may in some embodiments be configured to communicate wirelessly using a plurality of wireless communication standards or radio access technologies (RATs).

The wireless communication circuitry 330 may include UWB Logic 332, a Cellular Modem 334, and additional WLAN/PAN Logic 336. The UWB Logic 332 is for enabling the wireless device 300 to perform UWB communications and/or for ranging communications, e.g., according to 802.15.4 protocols. The WLAN/PAN Logic 336 is for enabling the wireless device 300 to perform other WLAN and/or PAN communications, such as Wi-Fi and/or Bluetooth communications. The cellular modem 334 may be capable of performing cellular communication according to one or more cellular communication technologies.

As described herein, wireless device 300 may include hardware and software components for implementing embodiments of this disclosure. For example, one or more components of the wireless communication circuitry 330 (e.g., UWB Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Assisted Timing Synchronization

Various RATs may have advantages and disadvantages relative to other RATs, which may lead to each RAT being advantageous for particular applications. For example, UWB communications, e.g., as described in IEEE 802.15.4-2015, incorporated by reference above, which is sometimes also referred to as pulse radio, is capable of providing wireless communications at low transmit power across large bandwidths (e.g., 500 MHz or more), with precise timing. This technology is therefore well suited for short-range communications in which multi-path interference is a concern. For example, UWB communications are well suited for indoor ranging and positioning applications, among other applications. However, an UWB radio may consume significant power while in a full-power state. Therefore, because UWB communications are often characterized by short bursts between long periods of inactivity, causing an UWB radio to remain continually in a full-power state to listen for incoming communications is very wasteful of system power. Thus, initial synchronization between UWB radios may, in some scenarios, be a high-cost operation, e.g., if one or more of the UWB radios must scan for an initial discovery or synchronization message over an extended period of time.

As another example, a BT radio may consume less power than an UWB radio while listening for incoming communications. Additionally, BT communications may have a longer range than UWB communications. Therefore, BT communications may be well suited to discovery of surrounding devices.

In light of the above, a first wireless device may use BT communications to perform discovery of and/or connection with a neighboring wireless device. In the course of BT message exchange for discovery and/or connection, the first wireless device may pass to the neighboring wireless device various information to synchronize subsequent UWB communications. For example, the first wireless device may use a BT communication to pass timing information regarding a time at which the first wireless device will transmit a subsequent UWB message. Additionally, the first wireless device and the neighboring wireless device may use timing information of one or more BT communication events to synchronize the timing of their respective UWB radios for communicating the subsequent UWB message.

By synchronizing timing of the UWB radio of the first wireless device with the timing of the UWB radio of the neighboring wireless device, the power efficiency of the UWB radios may be improved. For example, an UWB radio may operate in a low-power state, such as a sleep state, for a majority of the time. However, the UWB radio may enter a high-power state, such as a full-power state or a communication state, for one or more brief window(s) of time to transmit and/or receive UWB communications, e.g., according to timing information passed via one or more BT communications. Following such a window of time, the UWB radio may return to the low-power state. Greater precision and accuracy in synchronizing the timing of the UWB radios may allow the UWB radios to utilize a narrower window of time to transmit and/or receive UWB communications, which may lead to increased power savings.

Performing the timing synchronization of the UWB radios may be performed according to any of various methods, e.g., as outlined below.

It should be understood that UWB communications and BT communications are merely examples, and that other RATs may be substituted. For example, any discussion of UWB communications throughout the following methods may be applied to any RAT that may benefit from precise wake-up periods. Similarly, any discussion of BT communications throughout the following methods may be applied to any RAT that may be capable of communicating synchronization information for such wake-up periods.

Figure 4:
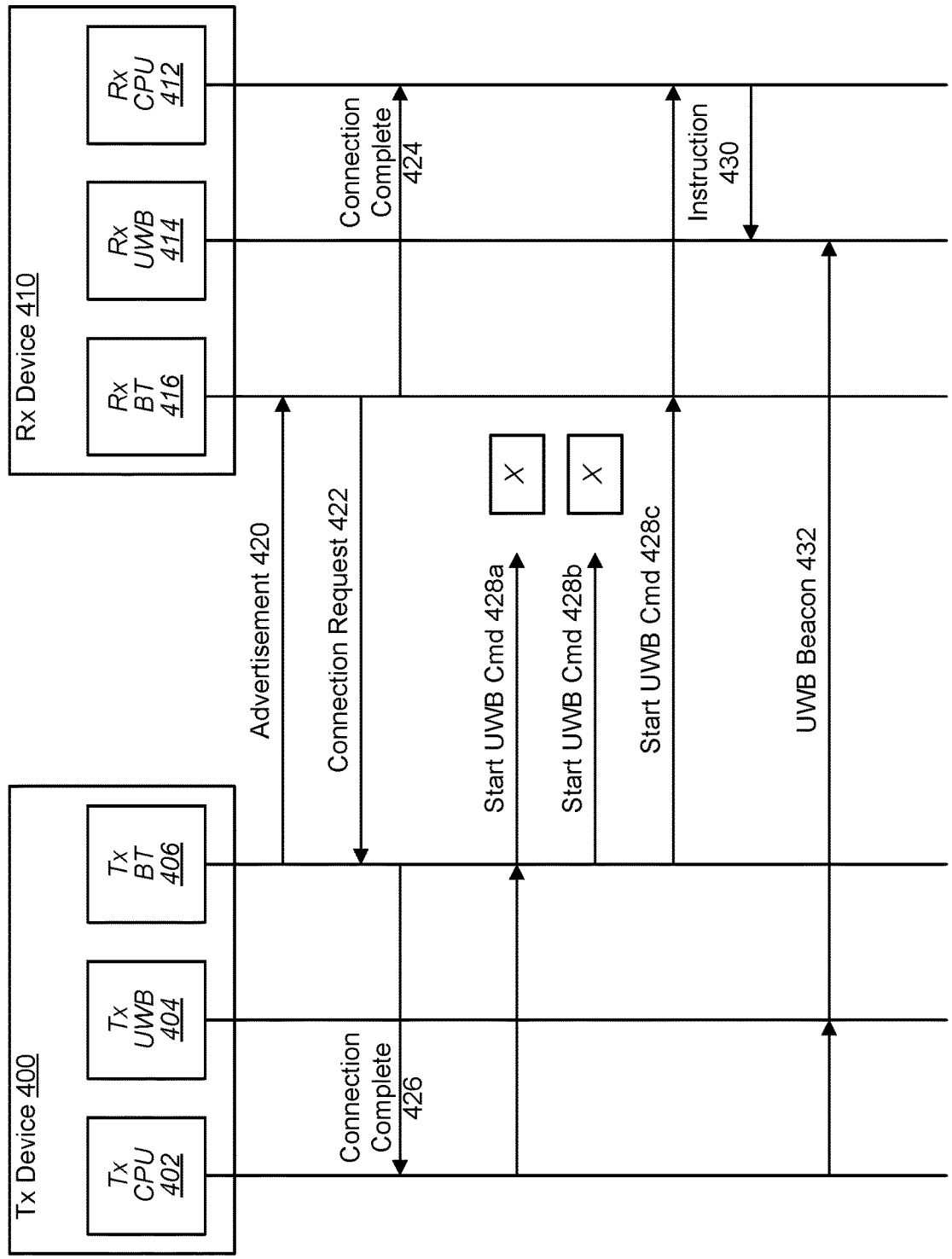
FIG. 4 illustrates a signal flow diagram for synchronizing BT and UWB communications in a BT connection scenario, using a standardized BT radio, according to some embodiments.

FIG. 4—Synchronization in a BT Connected State

FIG. 4 illustrates a signal flow diagram for synchronizing BT and UWB communications in a BT connection scenario, using a standardized BT radio, according to some embodiments. As illustrated, the signal flow may include a Tx device 400 and a Rx device 410. The Tx device 400 and the Rx device 410 may each be, or include, or be included in, a wireless communication device such as any of the wireless devices 102, 104, 200, or 300.

As illustrated, the Tx device 400 may include a Tx CPU 402, a Tx UWB radio 404, and a Tx BT radio 406, which may be communicatively coupled with each other in various configurations. For example, the modules shown within the Tx device 400 may be connected via one or more serial connection(s), general purpose input/output (GPIO) connection(s), and/or other connection(s). The Tx CPU 402 may be, or include, or be included in, an application processor, such as the processor(s) 302, and may be configured to run one or more applications or other software, e.g., to perform high-level communications processes for the Tx UWB radio 404 and/or the Tx BT radio 406. The Tx UWB radio 404 may be, include, or be included in, the UWB logic 332, and may be configured to perform UWB communications, e.g., including the steps outlined below. The BT radio 406 may be, include, or be included in the WLAN/PAN logic 336, and may be configured to perform BT communications, e.g., including the steps outlined below.

As illustrated, the Rx device 410 may include a Rx CPU 412, a Rx UWB radio 414, and a Rx BT radio 416, which may be communicatively coupled with each other in various configurations. For example, the Rx CPU 412, the Rx UWB radio 414, and the Rx BT radio 416 may be substantially similar to the Tx CPU 402, the Tx UWB radio 404, and the Tx BT radio 406, respectively.

As illustrated, the Tx BT 406 may transmit an advertisement (or advertisement set) 420. In some scenarios, the Tx BT 406 may transmit such an advertisement periodically, e.g., at regular intervals, such as 30 ms or 100 ms intervals. In some scenarios, the advertisement 420 may be formatted or configured as defined by relevant BT standards.

In response to receiving the advertisement 420, the Rx BT radio 416 may transmit a connection request 422. The connection request 422 may be configured to initiate a connection between the Rx BT radio 416 and the Tx BT radio 406, and may include any information appropriate for initiating such a connection. In some implementations, the connection request 422 may be configured as defined by relevant BT standards. Upon transmitting the connection request 422, the Rx BT radio 416 may provide a connection complete message 424 to the Rx CPU 412. The connection complete message 424 may be provided substantially immediately following transmission of the connection request 422. Upon receiving the connection complete message 424, the Rx CPU 412 may produce a timestamp noting the time, $T_{RxC}$, at which the connection complete message 424 was received. Specifically, the time $T_{RxC}$ may be noted according to the local clock of the Rx CPU 412.

In response to receiving the connection request 422, the Tx BT radio 406 may provide a connection complete message 426 to the Tx CPU 402. The connection complete message 426 may be provided substantially immediately following reception of the connection request 422. Upon receiving the connection complete message 426, the Tx CPU 402 may produce a timestamp noting the time, $T_{TxC}$, at which the connection complete message 426 was received. Specifically, the time $T_{TxC}$ may be noted according to the local clock of the Tx CPU 402.

Because the local clock of the Tx CPU 402 may not be synchronized with the local clock of the Rx CPU 412, the times recorded as $T_{RxC}$ and $T_{TxC}$ may differ, even though the connection complete message 424 and the connection complete message 426 may be received by the Rx CPU 412 and the Tx CPU 402, respectively, substantially simultaneously. Thus, the times $T_{RxC}$ and $T_{TxC}$ may serve as a known reference time that may be used to coordinate subsequent communications.

It should be understood that additional signaling may occur following the connection complete message 424 and the connection complete message 426, such as connection setup messaging, etc., which is not shown in FIG. 4, for simplicity.

The Tx CPU 402 may execute an application or other software that seeks to initiate a UWB communication, such as UWB ranging. The Tx CPU 402 may determine to transmit an UWB communication at a specific time. Following reception of the connection complete message 426, the Tx CPU 402 may further determine an offset time, $T_{off}$, that indicates an amount of time following $T_{TxC}$ at which transmission of the UWB communication will begin. For example, $T_{off}$ may indicate a value of 300 ms, indicating that the Tx UWB radio 404 will begin transmission of the UWB communication 300 ms after $T_{TxC}$. In other words, the transmission time may occur at the time $T_{TxC}+T_{off}$.

The Tx CPU 402 may communicate information regarding the impending UWB communication to the Rx CPU 412 via BT communications. For example, the TX CPU 402 may pass the information to the Tx BT radio 406, which may transmit the information to the Rx BT radio 416 as a start UWB command 428. The information passed to the Tx BT radio 406 and included in the start UWB command 428 may include an indication that the Tx UWB radio 404 will transmit an UWB communication, as well as the value of $T_{off}$. In some scenarios, the information may also include other information, such as a type of communication to be sent.

As illustrated, the start UWB command 428 may not be successfully transmitted on the first attempt. For example, the start UWB command 428a may represent a first attempt by the Tx BT radio 406 to transmit the start UWB command 428, which may not be received successfully by the Rx BT radio 416. For example, the Rx BT radio 416 may respond to the start UWB command 428a with a NAK message (not shown) or may fail to respond with an ACK message. In response, the Tx BT radio 406 may make subsequent attempts, as necessary to complete the communication. In the example scenario illustrated, the first two attempts, 428a and 428b, fail, but the Rx BT radio 416 successfully receives the start UWB command 428c.

The Rx BT radio 416 may pass to the Rx CPU 412 the payload received in the start UWB command 428, including the information regarding the impending UWB communication, which may include, e.g., $T_{off}$. In response to receiving the information regarding the impending UWB communication, the Rx CPU 412 may prepare to receive the UWB communication via the Rx UWB radio 414. For example, the Rx CPU 412 may communicate to the Rx UWB radio 414 information or instructions 430 to cause the Rx UWB radio 414 to attempt to receive an UWB communication at the time $T_{RxC}+T_{off}$. In some implementations, the information or instructions 430 may alternatively, or additionally, be communicated to the Rx UWB radio 414 by the Rx BT radio 416.

In some implementations, the Tx UWB radio 404 and/or the Rx UWB radio 414 may be configured to remain in a low-power state, such as a sleep state, under normal conditions, but to enter an active state (e.g., wake) to transmit and/or receive UWB communications at specific times. In such implementations, attempting to receive the UWB communication may include the Rx UWB radio 514 temporarily entering the active state to receive the UWB communication As an example, the Tx CPU 402 may cause the Tx UWB radio 404 to wake at a certain time to transmit an UWB beacon 432. The time for this transmission may be at the time $T_{TxC}+T_{off}$. After transmitting the UWB beacon 432, the Tx UWB radio 404 may return to the low-power mode.

In response to receiving the information regarding the impending UWB communication, the Rx CPU 412 (or the Rx BT radio 416) may cause the Rx UWB radio 414 to wake to receive the UWB beacon 432 at the time $T_{RxC}+T_{off}$. For example, the Rx CPU 412 may initiate a timer configured to expire at the time $T_{RxC}+T_{off}$, and upon expiration of the timer, may provide to the Rx UWB radio 414 the instruction 430 to wake immediately. As another example, the Tx CPU 412 may provide to the Rx UWB radio 414 the instruction 430, including a time value indicating the time remaining until the time $T_{RxC}+T_{off}$. The Rx UWB radio 414 may then initiate a timer configured to expire at the time $T_{RxC}+T_{off}$, based on the time value provided by the Rx CPU 412, and the Rx UWB radio 414 may wake upon expiration of the timer. In either example, the Rx UWB radio 414 may wake for a time window that begins at (or is centered at, includes, etc.) the time $T_{RxC}+T_{off}$. Because the time $T_{RxC}$ is synchronized with the time $T_{TxC}$, the Rx CPU 412 and/or the Rx UWB radio 414 may know when the UWB beacon 432 will be transmitted, with a high degree of precision, so the wake window of the RX UWB radio 414 may be brief. The length of the wake window may be determined based on various factors, such as the expected length of the UWB beacon 432 and/or other communications, and the precision of the synchronization, considering such factors as hardware delays, software delays, clock precision, transmission times, etc. In some scenarios, the length of the wake window may be a fixed, predetermined value. Following the wake window, the Rx UWB radio 414 may return to the low-power mode.

In some scenarios, subsequent communications may be performed within similarly brief wake windows. For example, if the UWB beacon 432 is an UWB ranging request message, then the Rx UWB radio 414 may transmit an UWB ranging response message at a fixed, predetermined time following receipt of the UWB beacon 432, e.g., as known in the art. Thus, the Rx UWB radio 414 and the Tx UWB radio 404 may each wake for a time window appropriate to transmit/receive the UWB ranging response message. Alternatively, or additionally, the Rx UWB radio 414 and the Tx UWB radio 404 may be configured to wake periodically following a first transmission. Alternatively, or additionally, the UWB beacon 432 may include information regarding one or more subsequent communications, including timing information, which may cause the Rx UWB radio 414 and/or the Tx UWB radio 404 to wake at one or more subsequent times to transmit and/or receive the subsequent communications.

In some implementations, BT events other than connection complete signals may alternatively, or additionally, be used to synchronize the timing of the Tx UWB radio 404 and the Rx UWB radio 414. For example, in some scenarios, the Tx BT radio 406 may transmit to the Rx BT radio 416 a connection update message, e.g., to indicate a change in the periodicity of BT advertisement messages. Upon transmitting such a connection update message, the Tx BT radio 406 may provide to the Tx CPU 402 a connection update event message. Upon receiving the connection update event message, the Tx CPU 402 may produce a timestamp noting the time, $T_{TxU}$, at which the connection update event message was received, e.g., according to the local clock of the Tx CPU 402. Similarly, upon receiving the connection update message, the Rx BT radio 416 may provide to the Rx CPU 412 a connection update event message. Upon receiving the connection update event message, the Rx CPU 412 may produce a timestamp noting the time, $T_{RxU}$, at which the connection update event message was received, e.g., according to the local clock of the Rx CPU 412. Because the two connection update event messages may be received by the Rx CPU 412 and the Tx CPU 402 substantially simultaneously, the times $T_{RxU}$ and $T_{TxU}$ may serve as a known reference time that may be used to coordinate subsequent communications in substantially the same manner as $T_{RxC}$ and $T_{TxC}$. This may allow the synchronization of the UWB radios to be updated at a time after connection establishment, e.g., periodically.

In some implementations, yet other BT events may be similarly used to synchronize, or update synchronization of, the Tx UWB radio 404 and the Rx UWB radio 414.

Figure 5:
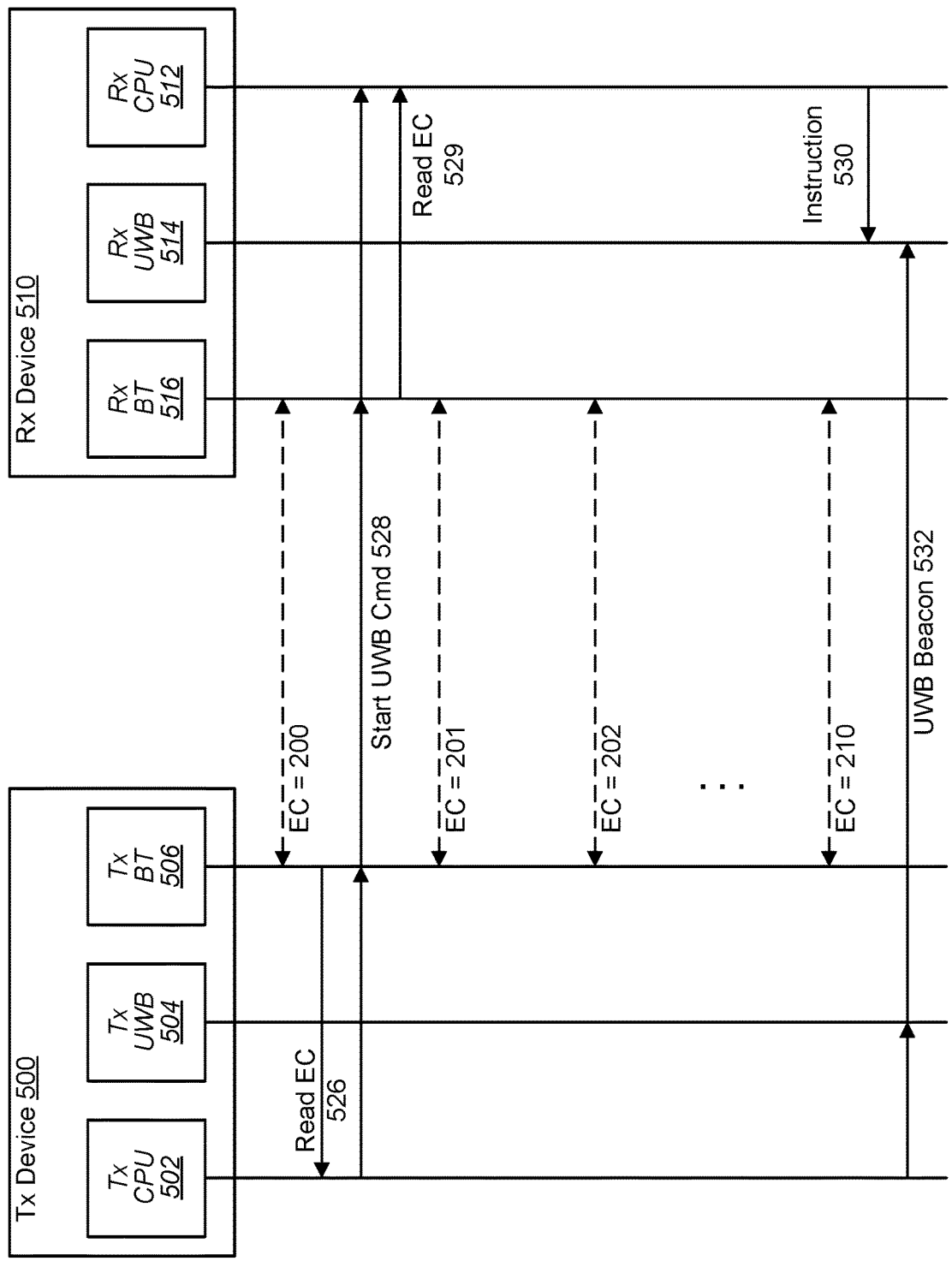
FIG. 5 illustrates a signal flow diagram for synchronizing BT and UWB communications in a BT connection scenario, using an enhanced BT radio, according to some embodiments.

FIG. 5—Enhanced Synchronization in a BT Connected State

FIG. 5 illustrates a signal flow diagram for synchronizing BT and UWB communications in a BT connection scenario, using an enhanced BT radio, according to some embodiments. As illustrated, the signal flow may include a Tx device 500 and a Rx device 510. The Tx device 500 and the Rx device 510 may each be, or include, or be included in, a wireless communication device such as any of the wireless devices 102, 104, 200, or 300.

As illustrated, the Tx device 500 may include a Tx CPU 502, a Tx UWB radio 504, and a Tx BT radio 506, which may be communicatively coupled with each other in various configurations. For example, the modules shown within the Tx device 500 may be connected via one or more serial connection(s), general purpose input/output (GPIO) connection(s), and/or other connection(s). The Tx CPU 502 may be, or include, or be included in, an application processor, such as the processor(s) 302, and may be configured to run one or more applications or other software, e.g., to perform high-level communications processes for the Tx UWB radio 504 and/or the Tx BT radio 506. The Tx UWB radio 504 may be, include, or be included in, the UWB logic 332, and may be configured to perform UWB communications, e.g., including the steps outlined below. The BT radio 506 may be, include, or be included in the WLAN/PAN logic 336, and may be configured to perform BT communications, e.g., including the steps outlined below.

As illustrated, the Rx device 510 may include a Rx CPU 512, a Rx UWB radio 514, and a Rx BT radio 516, which may be communicatively coupled with each other in various configurations. For example, the Rx CPU 512, the Rx UWB radio 514, and the Rx BT radio 516 may be substantially similar to the Tx CPU 502, the Tx UWB radio 504, and the Tx BT radio 506, respectively.

In the scenario illustrated in FIG. 5, the Tx BT 506 has already established a BT connection with the Rx BT radio 516. For example, the BT connection may be established in substantially the same manner as described with regard to FIG. 4, e.g., by communicating the advertisement (or advertisement set) 420, the connection request 422, the connection complete message 424, and the connection complete message 426.

Following establishment of the connection, the Tx BT radio 506 may periodically perform a handshake function with the Rx BT radio 516. FIG. 5 illustrates a plurality of handshake functions as dashed lines. The periodicity of the handshake function may be set, e.g., during connection establishment or at some other time, but may be known to both the Tx BT radio 506 and the Rx BT radio 516. The Tx BT radio 506 and the Rx BT radio 516 may each maintain a respective event counter (EC) that is incremented each time the handshake function is performed. Thus, the value of EC and/or the time of the most recent handshake function may serve as a known reference time value that may be used to coordinate subsequent communications.

The Tx CPU 502 may execute an application or other software that seeks to initiate an UWB communication, such as UWB ranging. The Tx CPU 502 may determine to transmit an UWB communication at a specific time. The Tx CPU 402 may receive from the Tx BT radio 506 a read EC message 526, including the current EC value, $EC_{current}$. In the scenario illustrated in FIG. 5, $EC_{current}$ is 200.

In response to receiving the read EC message 526, the Tx CPU 502 may determine the EC value, $EC_{UWB}$, representing what the EC value will be at the time the UWB communication will begin. For example, if the UWB communication will begin in 300 ms, and the handshake function is performed with a period of 30 ms, then the EC value will increment 10 more times before the UWB communication begins. Because $EC_{current}$ was reported by the read EC message 526 to be 200, the Tx CPU 502 may determine that $EC_{UWB}$ will be 210. The Tx CPU 502 may communicate $EC_{UWB}$ to the Rx CPU 512, e.g., via a BT communication. For example, the TX CPU 502 may pass $EC_{UWB}$ to the Tx BT radio 506, which may transmit the information to the Rx BT radio 516 as a start UWB command 528. The start UWB command 528 may further include an indication that the Tx UWB radio 504 will transmit an UWB communication at $EC_{UWB}$. In some scenarios, the start UWB command 528 may also include other information, such as a type of communication to be sent.

In some implementations, following (or concurrent with) transmission of the start UWB command 528, the Tx CPU 502 or the Tx UWB radio 504 may start a timer to identify the time at which the UWB communication is to be sent. In the present example, the timer may have a value of 300 ms, consistent with the timing information send in the start UWB command 528. The Tx CPU 502 may cause the Tx UWB radio 504 to transmit the UWB communication upon expiration of the timer.

In other implementations, the Tx CPU 502 and/or the Tx UWB radio 504 may use any other method to determine the start time of the UWB communication. For example, after determining $EC_{UWB}$, the Tx CPU 502 may periodically obtain the current value of EC, and cause the Tx UWB radio 504 to transmit the UWB communication in response to determining that the EC value has reached $EC_{UWB}$ (e.g., 210 in the example of FIG. 5).

The Rx BT radio 516 may pass to the Rx CPU 512 the payload received in the start UWB command 528, including the information regarding the impending UWB communication, which may include $EC_{UWB}$. The Rx BT radio 516 may also provide to the Rx CPU 512 the value of $EC_{current}$, based on the event counter maintained by the Rx BT radio 516. For example, the Rx BT radio 516 may provide to the Rx CPU 512 a read EC message 529, which may include $EC_{current}$, e.g., as determined at or near the time the Rx BT radio 516 receives the start UWB command 528 or the time the Rx BT radio 516 provides the information regarding the impending UWB communication to the Rx CPU 512. A goal may be to strive to communicate to the Rx CPU 512 (e.g., via the read EC message 529) the same EC value that was communicated to the Tx CPU 502 via the read EC message 526.

In response to receiving $EC_{UWB}$ and $EC_{current}$, the Rx CPU 512 may start a timer to identify the time at which the UWB communication is to be sent (e.g., 300 ms in the example of FIG. 5). The Rx CPU 512 may cause the Rx UWB radio 514 to attempt to receive the UWB communication upon expiration of the timer, e.g., by communicating to the Rx UWB radio 514 information or instructions 530.

Alternatively, the Rx CPU 502, the Rx UWB radio 514 and/or the Rx BT radio 516 may use any other method to determine the start time of the UWB communication, based on the received value of $EC_{UWB}$. For example, in some implementations, the Rx BT radio 516 may periodically provide to the Rx CPU 512 the current value of EC, e.g., each time the value of EC is incremented, or at some less frequent interval. In response, the Rx CPU 512 may cause the Rx UWB radio 514 to attempt to receive the UWB communication upon determining that EC has reached the value of $EC_{UWB}$. As another example, in some implementations, the Rx BT radio 516 may determine the value of $EC_{UWB}$ from the start UWB command 528. In response, the Rx BT radio 516 may provide an indication (e.g., raise a GPIO signal or report the current value of EC) to the Rx CPU 512 and/or to the Rx UWB radio 514 upon incrementing the EC to the value of $EC_{UWB}$ (e.g., 210 in the example of FIG. 5). In response to the indication, the Rx UWB radio 514 may attempt to receive the UWB communication, or the Rx CPU 512 may cause the Rx UWB radio 514 to attempt to receive the UWB communication, e.g., by communicating to the Rx UWB radio 514 information or instructions 530.

In some implementations, the Tx UWB radio 504 and/or the Rx UWB radio 514 may be configured to remain in a low-power state, such as a sleep state, under normal conditions, but to enter an active state (e.g., wake) to transmit and/or receive UWB communications at specific times. In such implementations, attempting to receive the UWB communication may include the Rx UWB radio 514 temporarily entering the active state to receive the UWB communication.

As an example, the Tx CPU 502 may cause the Tx UWB radio 504 to wake at a certain time to transmit an UWB beacon 532. The time for this transmission may be at the time that the value of EC is $EC_{UWB}$ (e.g., upon detecting that the EC has incremented to the value $EC_{UWB}$). After transmitting the UWB beacon 532, the Tx UWB radio 504 may return to the low-power mode.

As noted above, the Rx CPU 512 may cause the Rx UWB radio 514 to wake to receive the UWB beacon 532 at the appropriate time. Because the BT event counter of the Rx BT radio 516 is synchronized with the BT event counter of the Tx BT radio 506, the Rx CPU 512 and/or the Rx UWB radio 514 may know when the UWB beacon 532 will be transmitted, with a high degree of precision, so the wake window of the RX UWB radio 514 may be brief. Following the wake window, the Rx UWB radio 514 may return to the low-power mode.

In some scenarios, subsequent communications may be performed within similarly brief wake windows, e.g., as outlined with regard to FIG. 4.

In various implementations, the BT radios 506 and 516 may communicate EC values to their respective CPUs 502 and 512 in any of various ways. For example, the BT radio may provide the current value of EC to the respective CPU via a serial or parallel connection, e.g., periodically or in response to a request from the CPU. As another example, the BT radio may have a dedicated output to provide the current EC value, which may be read by the CPU at any time. As another example, the Rx BT radio 516 may include the current EC value when passing to the Rx CPU 512 payload data from a BT communication, such as the start UWB command 528.

In some scenarios, the signal flow illustrated in FIG. 5 may allow more precise synchronization between the two UWB radios than the signal flow illustrated in FIG. 4. This may allow narrower wake windows for UWB communications, resulting in additional power savings. However, in some implementations, custom BT hardware and/or firmware may be needed to enable output of the current EC value, which may lead to increased hardware cost.

Figure 6:
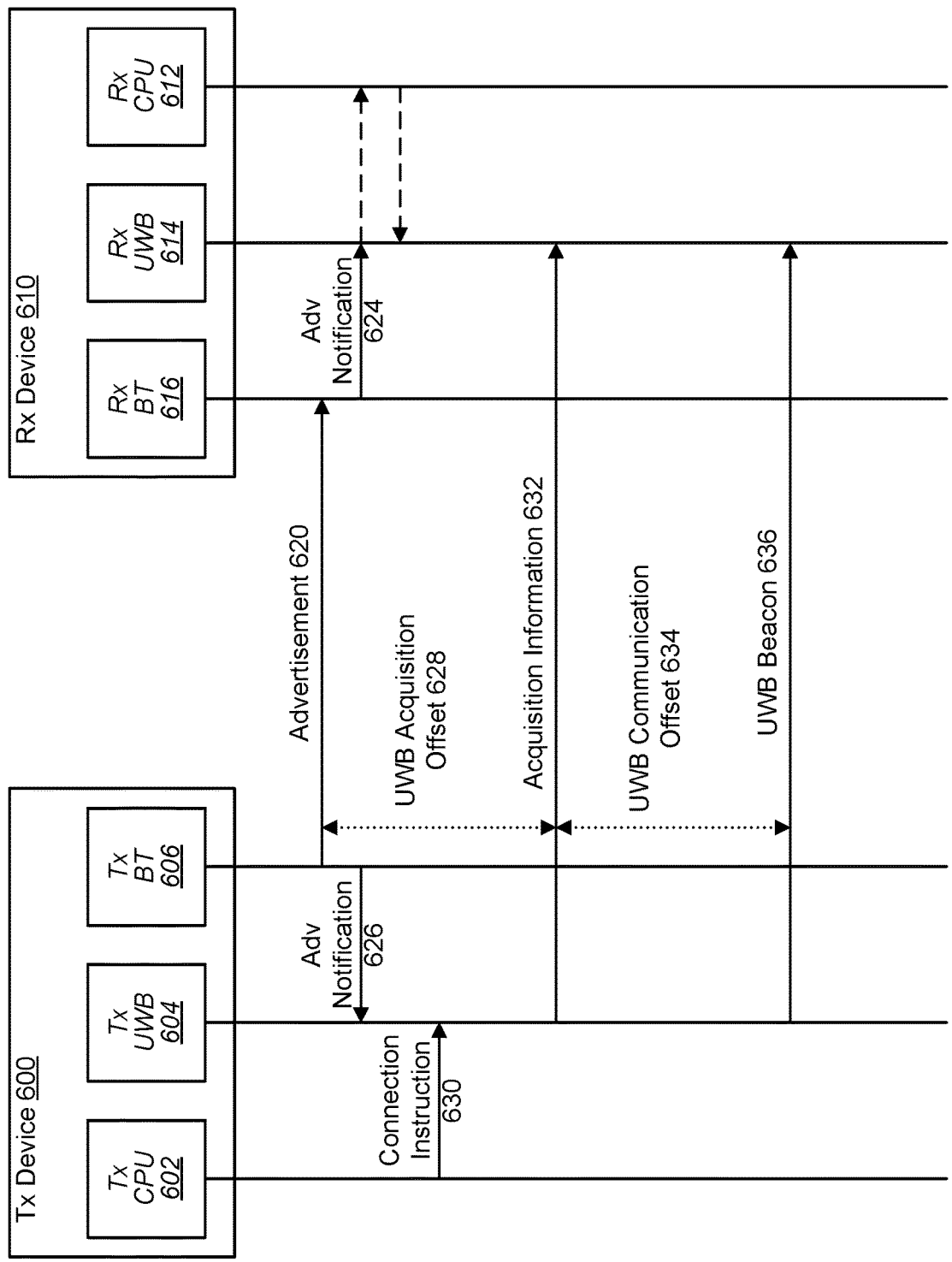
FIG. 6 illustrates a signal flow diagram for synchronizing BT and UWB communications in a BT non-connected scenario, according to some embodiments.

FIG. 6—Synchronization in a BT Non-Connected State

The scenarios illustrated in FIG. 4 and FIG. 5 allow for synchronization between a Tx UWB radio and an Rx UWB radio based on knowledge of timing of BT events involved in establishing or maintaining a BT connection. However, in some scenarios, e.g., where the Tx device does not have payload data to pass over BT, the Tx BT radio may not establish a connection with the Rx BT radio. In such scenarios, it may still be possible to use BT events to synchronize the Tx UWB radio and the Rx UWB radio.

FIG. 6 illustrates a signal flow diagram for synchronizing BT and UWB communications in a BT non-connected scenario, according to some embodiments. As illustrated, the signal flow may include a Tx device 600 and a Rx device 610. The Tx device 600 and the Rx device 610 may each be, or include, or be included in, a wireless communication device such as any of the wireless devices 102, 104, 200, or 300. In some scenarios, the Tx device 600 may be similar or identical to the Tx device 400 or the Tx device 500, and the Rx device 610 may be similar or identical to the Rx device 410 or the Rx device 510.

As illustrated, the Tx BT radio 606 may transmit an advertisement (or advertisement set) 620. In some scenarios, the Tx BT 606 may transmit such an advertisement periodically, e.g., at regular intervals. The advertisement 620 may include a transmitter address and/or a receiver address (e.g. transmitter and/or receiver MAC addresses), authentication information, and/or any other information appropriate for identifying the Tx device 600 and/or the Rx device 610 (e.g., identifying Tx BT radio 606 and/or the Rx BT radio 616).

In the scenario illustrated in FIG. 6, the Rx BT radio 616 may receive the advertisement 620, but may decline to establish a connection with the Tx BT radio 606.

However, the Rx BT 616 may provide to the Rx UWB radio 614 an advertisement notification 624, e.g., via a serial interface or other connection. In some scenarios, the advertisement notification 624 may include the advertisement 620, or some portion thereof, which may include, e.g., the transmitter address and/or the receiver address, the authentication information, etc. The advertisement notification 624 may also include a timestamp of the time, $T_{RxA}$ at which the advertisement 620 was received by the Rx BT radio 616. Alternatively, or additionally, the Rx BT 616 may provide the advertisement notification 624 to the Rx CPU 612, which may then provide the advertisement notification 624, or some portion thereof, to the Rx UWB 614.

In response to receiving the advertisement notification 624, the Rx UWB radio 614 may determine whether the advertisement was addressed to the Rx device 610, e.g., using address information included in the advertisement notification 624. If so, the Rx UWB radio 614 may transition from a low-power state (e.g., a sleep state) to a high-power state (e.g., a full power state) capable of receiving UWB communications. Specifically, the Rx UWB radio 614 may perform this state transition upon expiration of an offset time, shown in FIG. 6 as UWB acquisition offset 628. For example, the Rx UWB radio 614 may start a timer to determine when the UWB acquisition offset 628 has elapsed, starting at the time indicated in the timestamp of the time at which the advertisement 620 was received by the Rx BT radio 616. In other words, the Rx UWB radio 614 may initiate a timer configured to expire at a time defined as $(T_{RxA}+$UWB acquisition offset 628$)$. When the timer has elapsed, the Rx UWB radio 614 may transition to the high-power state for a predetermined window of time, to receive any available UWB communications, and may then transition back to the low-power state following the window of time. In some scenarios, the UWB acquisition offset 628 may be predetermined. In some scenarios, the UWB acquisition offset 628 may be communicated in the advertisement 620, and passed in the advertisement notification 624.

Upon transmitting the advertisement 620, the Tx BT radio 606 may provide to the Tx UWB radio 604 an advertisement notification 626. In some scenarios, the advertisement notification 626 may be similar to the advertisement notification 624. For example, the advertisement notification 626 may include the advertisement 620, or some portion thereof, which may include, e.g., the transmitter address and/or the receiver address. The advertisement notification 626 may also include a timestamp of the time, $T_{TxA}$, at which the advertisement 620 was transmitted by the Tx BT radio 606.

The Tx CPU 602 may execute an application or other software that seeks to initiate a UWB communication, such as UWB ranging. The Tx CPU 602 may therefore communicate to the Tx UWB radio 604 an instruction or information 630 to initiate UWB communications with the Rx device 610 (e.g., with the Rx UWB radio 614). The connection instruction 630 is illustrated as occurring after the advertisement notification 626, but it may, in some scenarios, be communicated prior to the advertisement notification 626 and/or the advertisement 620.

In response to receiving the advertisement notification 626, the Tx UWB radio 604 may start a timer to determine when the UWB acquisition offset 628 has elapsed, starting at the time indicated in the timestamp of the time at which the advertisement 620 was transmitted. In other words, the Tx UWB radio 604 may initiate a timer configured to expire at a time defined as $(T_{TxA}+$UWB acquisition offset 628$)$. When the timer has elapsed, if the Tx UWB radio 604 has not yet received the connection instruction 630, then the Tx UWB radio 604 may take no further action at that time, e.g., until receiving a subsequent advertisement notification 626, reporting a subsequent advertisement 620 (e.g., if the advertisements are transmitted periodically). Specifically, in such scenarios, upon the timer elapsing, the Tx UWB radio 604 may remain in a low-power state, and not transmit any UWB communication. However, upon the timer elapsing, if the Tx UWB radio 604 has received the connection instruction 630, as illustrated in FIG. 6, then the Tx UWB radio 604 may transition from a low-power state to a high-power state capable of transmitting UWB communications, and may transmit UWB acquisition information 632. The Tx UWB radio 604 may then return to the low-power state.

The acquisition information 632 may include timing information, and any other appropriate information, regarding subsequent UWB communications. For example, the subsequent UWB communications may be scheduled at one or more time(s) independent of BT advertisements or other BT events. As a specific example, the acquisition information 632 may include UWB communication offset 634, indicating an offset time at which the UWB beacon 636 will be transmitted, relative to the time at which the acquisition information 632 is transmitted. In such an example, the Tx UWB radio 604 may, upon transmitting the acquisition information 632, begin a timer having a duration matching the UWB communication offset 634. Upon expiration of the timer, the Tx UWB radio 604 may transition to the high-power state and transmit the UWB beacon 636. The Tx UWB radio 604 may then transition back to the low-power state.

In some implementations, the acquisition information 632 may be addressed to the same receiver address (e.g., MAC address) as the advertisement 620. In some implementations, the acquisition information 632 may include the same transmitter address (e.g., MAC address) as the advertisement 620. In some implementations, the Rx UWB radio 614 may verify one or both of these addresses and/or other identification information included in the acquisition information 632 to determine that the acquisition information 632 is intended for the Rx UWB radio 614, e.g., to avoid false synchronization with a third party.

As noted above, the Rx UWB radio 614 may transition to the high-power state for a window of time upon expiration of a timer measuring the UWB acquisition offset 628. If the Tx UWB radio 604 does not transmit the acquisition information 632, then the RX UWB radio 614 may receive no communication during this time window, and may transition back to the low-power state, and take no further action until receiving a subsequent advertisement notification 624. However, if the Tx UWB radio 604 does transmit the acquisition information 632, then the Rx UWB radio 614 may receive the acquisition information 632 during the window of time during which the Rx UWB radio 614 is in the high-power mode.

In response to receiving the acquisition information 632, the Rx UWB radio 614 may set a timer having a duration matching the UWB communication offset 634, as received in the acquisition information 632. Upon expiration of the timer, the Rx UWB radio 614 may transition to the high-power state and receive the UWB beacon 636. The Rx UWB radio 614 may then return to the low-power state.

In some scenarios, subsequent communications may be performed within similarly brief wake windows, e.g., substantially as outlined above with regard to FIG. 4.

In some implementations, the Rx BT radio 616 may operate according to a different (e.g., independent) clock than the Rx UWB radio 614. In such implementations, it may be beneficial to synchronize, or index, the two clocks. For example, if the Rx BT radio 616 passes to the Rx UWB radio 614, e.g., in the advertisement notification 624, a timestamp indicating the time at which the Rx BT radio 616 received the advertisement 620 (wherein the timestamp would note the time according to the clock of the Rx BT radio 616), then the Rx UWB radio 614 may be unable to identify the corresponding time according to the clock of the Rx UWB radio 614, if the two radios were not synchronized or otherwise indexed.

In some implementations, synchronization of the clocks associated with the Rx BT radio 616 and the Rx UWB radio 614 may be performed using a GPIO, or other low-latency connection. For example, the Rx BT radio 616 and the Rx UWB radio 614 may each note the time according to its respective local clock upon a falling or rising edge of a signal passed on a GPIO between the two radios. One or both of the radios may then communicate the noted time to the other, and use the two times to determine an offset between the two clocks.

In some implementations, synchronization of the clocks associated with the Tx BT radio 606 and the Tx UWB radio 604 may be performed in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless communication device, comprising:
a first radio configured to:
   establish a connection with a remote wireless device according to a first radio access technology (RAT);
   provide an indication to a processor of the wireless communication device that the connection has been established;
   after providing the indication, receive, from the remote wireless device, a notification that the remote wireless device will transmit a communication according to a second RAT, wherein the notification includes an offset time; and
   provide the offset time to the processor;
the processor, configured to:
   store a timestamp indicating a time at which the processor receives the indication that the connection has been established; and
   provide to a second radio of the wireless communication device an instruction to receive the communication according to the second RAT at a set time, wherein the set time is determined by adding the offset time to the time indicated by the timestamp; and
the second radio, configured to:
   in response to receiving the instruction to receive the communication according to the second RAT, transition from a low-power state to a high-power state at the set time;
   receive the communication according to the second RAT; and
   transition from the high-power state to the low-power state after receiving the communication according to the second RAT.

2. The wireless communication device of claim 1, wherein the first RAT is Bluetooth and the second RAT is ultra wideband (UWB).

3. The wireless communication device of claim 1, wherein, in establishing the connection with the remote wireless device according to the first RAT, the first radio is configured to:
receive, from the remote wireless device, an advertisement message according to the first RAT; and
transmit, to the remote wireless device, a connection request message according to the first RAT, in response to receiving the advertisement message.

4. The wireless communication device of claim 3, wherein, in providing the indication to the processor that the connection has been established, the first radio is configured to:
provide an indication to the processor that the connection request has been transmitted.

5. The wireless communication device of claim 1, wherein, in providing to the second radio the instruction to receive the communication according to the second RAT at a set time, the processor is configured to:
initiate a timer configured to expire at the set time; and
in response to expiration of the timer, provide to the second radio an instruction to immediately receive the communication according to the second RAT.

6. The wireless communication device of claim 1, wherein, in transitioning from a low-power state to a high-power state at the set time, the second radio is configured to:
receive from the processor an indication of the time remaining until the set time;
in response to expiration of the time remaining, transition from the low-power state to the high-power state.

7. The wireless communication device of claim 1, wherein the communication according to the second RAT is an ultra wideband (UWB) ranging request message, wherein the second radio is further configured to:
transition from the low-power state to the high-power state at a predetermined time after receiving the UWB ranging request message;
in response to receiving the UWB ranging request message, transmit an UWB ranging response message while operating in the high-power state; and
transition from the high-power state to the low-power state after transmitting the UWB ranging response message.

8. A wireless communication device, comprising:
a first radio configured to:
maintain an event counter that is incremented in response to a periodic handshake procedure with a remote wireless device, according to a first radio access technology (RAT);
receive, from the remote wireless device, a notification that the remote wireless device will transmit a communication according to a second RAT, wherein the notification indicates a future value of the event counter at which the communication will be transmitted; and
a second radio configured to:
transition from a low-power state to a high-power state when the event counter reaches the future value indicated in the notification that the remote wireless device will transmit the communication according to the second RAT;
receive the communication according to the second RAT; and
transition from the high-power state to the low-power state after receiving the communication according to the second RAT.

9. The wireless communication device of claim 8, wherein the first radio is further configured to:
establish a connection with the remote wireless device according to the first RAT prior to receiving the notification that the remote wireless device will transmit the communication according to the second RAT.

10. The wireless communication device of claim 8, further comprising a processor,
wherein the first radio is further configured to:
provide to the processor the future value of the event counter; and
provide to the processor a value of the event counter that is current at the time the first radio provides to the processor the future value of the event counter;
wherein the processor is configured to:
in response to determining that the event counter has reached the future value, provide to the second radio an instruction to receive the communication according to the second RAT; and
wherein the second radio transitioning from the low-power state to the high-power state is in response to receiving the instruction from the processor.

11. The wireless communication device of claim 10, wherein the first radio is further configured to:
periodically provide to the processor a current value of the event counter.

12. The wireless communication device of claim 10, wherein the first radio is further configured to:
provide to the processor an indication that the event counter has reached the future value.

13. The wireless communication device of claim 8, wherein the first radio is further configured to:
provide to the second radio an indication that the event counter has reached the future value;
wherein the second radio transitioning from the low-power state to the high-power state is in response to receiving the indication that the event counter has reached the future value.

14. The wireless communication device of claim 8, wherein the value of the event counter matches a value in a remote event counter maintained by the remote wireless device.

15. A wireless communication device, comprising:
a first radio configured to:
receive, from a remote wireless device, an advertisement message according to a first radio access technology (RAT);
provide, to a second radio of the wireless communication device, an indication that the advertisement message has been received, wherein the indication includes a timestamp indicating a time at which the advertisement message was received by the first radio; and
the second radio, configured to:
in response to receiving the indication that the advertisement message has been received, transition from a low-power state to a high-power state at a set time, wherein the set time is determined by adding a first offset time to the time indicated by the timestamp;
while operating in the high-power state, receive, according to a second RAT, acquisition information regarding a subsequent communication according to the second RAT, wherein the subsequent communication follows the acquisition information by a second offset time, wherein the acquisition information indicates the second offset time; and transition from the high-power state to the low-power state after receiving the acquisition information.

16. The wireless communication device of claim 15, wherein the second radio is further configured to:
   transition from the low-power state to the high-power state in response to expiration of the second offset time;
   while operating in the high-power state, receive the subsequent communication according to the second RAT; and
   transition from the high-power state to the low-power state after receiving the subsequent communication according to the second RAT.

17. The wireless communication device of claim 15, wherein the advertisement message indicates the value of the first offset time.

18. The wireless communication device of claim 15, wherein the offset time is predetermined.

19. The wireless communication device of claim 15, wherein the indication that the advertisement message has been received includes a medium access control (MAC) address to which the advertisement message was addressed; and
   wherein the second radio is further configured to confirm that the acquisition information is also addressed to the MAC address.

20. The wireless communication device of claim 15, wherein the first radio comprises a first clock and the second radio comprises a second clock, wherein the second radio is further configured to:
   determine a value of the second clock upon detecting a signal edge on an interface between the first radio and the second radio;
   receive from the first radio a value of the first clock upon the first radio detecting the signal edge on the interface between the first radio and the second radio;
   determine a difference between the value of the second clock and the value of the first clock;
   wherein determining the time indicated by the timestamp comprises adjusting the value of the timestamp by the difference between the value of the second clock and the value of the first clock.

* * * * *